March 13, 1962 F. W. W. MORLEY ETAL 3,024,624
AIRCRAFT AND TURBINE OPERATED AUXILIARY EQUIPMENT
Filed Aug. 31, 1959
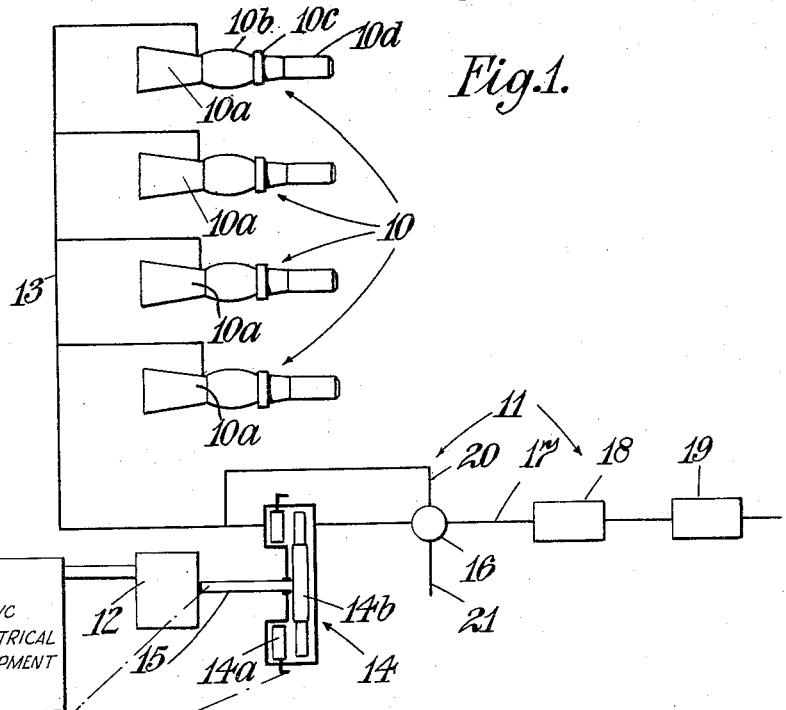
Fig.1.
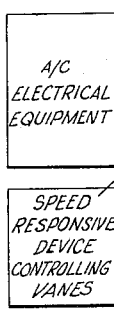
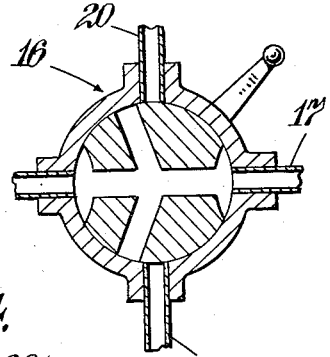
Fig.2. Fig.3.
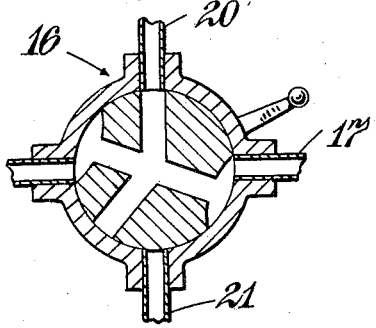
Fig.4.

United States Patent Office 3,024,624
Patented Mar. 13, 1962

3,024,624
AIRCRAFT AND TURBINE OPERATED AUXILIARY EQUIPMENT
Frederick William Walton Morley, Castle Donington, David Omri Davies, Kingsway, Derby, and Frederick Langham Grint, Belper, England, assignors to Rolls-Royce Limited, Derby, England, a company of Great Britain
Filed Aug. 31, 1959, Ser. No. 837,125
Claims priority, application Great Britain Sept. 4, 1958
5 Claims. (Cl. 62—402)

This invention comprises improvements in or relating to aircraft and is concerned primarily with aircraft auxiliary equipment which is operated by compressed air taken from power plant of the aircraft.

According to the present invention, auxiliary equipment for an aircraft having gas-turbine power plant includes an alternator for supplying operating current to electrical equipment of the aircraft and a cabin air supply system which in operation receives air tapped from a compressor of the power plant and which comprises an air turbine wherein the pressure and temperature of the tapped air are reduced prior to delivery to the cabin, the alternator being driven by the air turbine.

When have found that under some conditions of operation of modern gas-turbine powered aircraft having a cabine air supply system and other auxiliary equipment operated by compressed air from the gas turbine power plant, the quantity of air required to be tapped from the engine is excessive, and we have further found that under most conditions of operation the quantity of air required to operate the cabine air supply system is in excess of that necessary to drive a turbo-alternator for supplying current to electrical equipment of the aircraft. Thus by adopting the arrangement of this invention, the total quantity of air tapped from the engine is reduced as compared with arrangements in which the turbo-alternator and cabin air supply system are separate without undesirably affecting the output of the alternator.

According to a preferred feature of this invention, the air turbine is provided at its inlet with adjustable nozzle guide vanes permitting the speed of the turbine and thus of the alternator to be controlled as desired. For instance, the guide vanes may be controlled by a speed responsive device driven by the alternator to give a constant rotational speed of the alternator.

According to another feature of this invention, the air turbine may have a by-pass from its inlet to its outlet and connections from its outlet to the cabin and to an overboard spill, the flows in the by-pass and the two connections being controlled for example by a single valve.

In use of the invention in multi-engined aircraft, the air turbine, or, where a plurality of such turbines and associated alternators are provided, each air turbine is connected to an air supply manifold, which is connected to each engine to receive compressed air therefrom.

The invention also includes an aircraft powered by gas-turbine engines and incorporating auxiliary equipment arranged to be operated as above set forth.

One construction of this invention is illustrated in the accompanying diagrammatic drawing which shows, in FIGURE 1 a plurality of gas-turbine jet propulsion engines 10, each having a compressor 10a, combustion equipment 10b, a turbine 10c and an exhaust assembly 10d, and a cabin air supply system 11 and an alternator 12 operated by air tapped from the engines.

The air is tapped from the high-pressure ends of the compressors 10a and is delivered into a manifold 13 from which it is taken to the inlet of an air turbine 14 forming part of the cabin air supply system 11. The air turbine 14 comprises a ring of nozzle guide vanes 14a which are adjustable in pitch to permit control of the turbine, and a rotor 14b connected by a shaft 15 to drive the alternator 12. The pitch adjustment may be made dependent on alternator speed by a speed responsive device (not shown).

The outlet of the turbine is connected through a three-position valve 16 and conduit 17 to air cooling equipment 18 from which air flows to cabin 19. The valve 16 also has connected to it the downstream end of a by-pass conduit 20 joining the inlet and outlet sides of the turbine 14 and an overboard spill conduit 21 which is employed to direct overboard any air in excess of the cabin requirements.

The three-position valve 16 is arranged so that any of the three positions shown in FIGURES 2, 3 and 4 can be obtained.

In FIGURE 2 the position of the valve caters for the condition in which the turbine requires more air than the cabin. Some of the air from the turbine is split through the overboard spill conduit, the remainder of the air from the turbine passing through conduit 17 to the cooling equipment 18.

The position of the valve shown in FIGURE 3 caters for the condition in which the turbine and the cabin require the same amount of air. In this condition the whole of the air passes through both the turbine and the cooling equipment 18 and no connection is made to the by-pass 20 or the overboard spill conduit 21.

The position of the valve shown in FIGURE 4 is to cater for the condition in which the turbine requires less air than the cabin. In this condition some of the air by-passes the turbine via conduit 20 and joins the air which flows through the turbine to pass into conduit 17 and thence to the cooling equipment.

If more than one alternator and turbine are employed the additional turbine can be put in parallel with the turbine 14 and, if desired, an additional valve 16 can be used to control the additional turbine air supply. Alternatively, the two turbines could be controlled by a single valve.

We claim:
1. An aircraft having a cabin, gas turbine power plant, the power plant including air compressor means, electrical equipment, an alternator connected to supply operating current to the electrical equipment, and a cabin air supply system including an air turbine, said air turbine having an inlet connected to the compressor means to receive compressed air therefrom and also having an outlet, the pressure and temperature of the compressed air being reduced in the air turbine, the air turbine being connected to drive the alternator, a by-pass around the air turbine and having an inlet end connected to the inlet of the turbine and an outlet, a first connection to the cabin, a second connection to atmosphere, and valve means having said air turbine outlet, said by-pass outlet and said first and second connections connected thereto, said valve means being adjustable and providing a variable interconnection between said outlets and said first and second connections.

2. An aircraft as claimed in claim 1, said valve means being a three-positioned valve, and having a first position of adjustment in which the turbine outlet is connected to both said first and second connections and the by-pass outlet is closed, a second position of adjustment in which the turbine outlet is connected solely to the cabin and the bypass outlet is closed, and a third position of adjustment in which the turbine outlet and the by-pass outlet are both connected to the first connection and are both disconnected from the second connection.

3. An aircraft according to claim 1, said power plant including a plurality of gas-turbine engines each having an associated air compressor, said compressors together forming the compressor means, an air supply manifold connected to receive compressed air from each compressor, the air turbine having its inlet connected to the air supply manifold.

4. An aircraft as claimed in claim 1, said air turbine having adjustable nozzle guide vanes at its inlet.

5. An aircraft as claimed in claim 4 comprising a device responsive to rotational speed of the alternator connected to control adjustment of the nozzle guide vanes.

References Cited in the file of this patent

UNITED STATES PATENTS

| | | |
|---|---|---|
| 2,582,848 | Price | Jan. 15, 1952 |
| 2,677,932 | Forsling | May 11, 1954 |
| 2,851,863 | Theed | Sept. 16, 1958 |

FOREIGN PATENTS

| | | |
|---|---|---|
| 738,895 | Great Britain | Oct. 19, 1955 |